(12) United States Patent
Schwindt

(10) Patent No.: US 11,668,811 B2
(45) Date of Patent: Jun. 6, 2023

(54) METHOD AND SYSTEM TO IDENTIFY AND DISPLAY SUSPICIOUS AIRCRAFT

(71) Applicant: GE Aviation Systems Limited, Cheltenham (GB)

(72) Inventor: Stefan Alexander Schwindt, Cheltenham (GB)

(73) Assignee: GE Aviation Systems Limited, Cheltenham (GB)

(*) Notice: Subject to any disclaimer, the term of this patent is extended or adjusted under 35 U.S.C. 154(b) by 558 days.

(21) Appl. No.: 16/690,564

(22) Filed: Nov. 21, 2019

(65) Prior Publication Data

US 2020/0166632 A1    May 28, 2020

(30) Foreign Application Priority Data

Nov. 22, 2018 (GB) .................................. 1819030

(51) Int. Cl.
| | |
|---|---|
| *G01S 13/78* | (2006.01) |
| *G01S 13/76* | (2006.01) |
| *G01S 13/91* | (2006.01) |
| *G08G 5/00* | (2006.01) |

(52) U.S. Cl.
CPC .......... *G01S 13/781* (2013.01); *G01S 13/765* (2013.01); *G01S 13/91* (2013.01); *G08G 5/0013* (2013.01); *G08G 5/0021* (2013.01); *G08G 5/0078* (2013.01)

(58) Field of Classification Search
CPC ...... G01S 13/781; G01S 13/765; G01S 13/91; G01S 7/04; G08G 5/0013; G08G 5/0021; G08G 5/0078; G08G 5/0052; G08G 5/0008; G01C 23/00; B64D 43/00; B64D 45/0015

See application file for complete search history.

(56) References Cited

U.S. PATENT DOCUMENTS

| | | | |
|---|---|---|---|
| 6,967,616 B2 | 11/2005 | Etnyre | |
| 7,612,716 B2 | 11/2009 | Smith et al. | |
| 7,688,250 B2 | 3/2010 | Billaud et al. | |
| 8,736,465 B2* | 5/2014 | Rutherford | G08G 5/0021 340/961 |
| 9,069,077 B2 | 6/2015 | Hartley et al. | |
| 9,182,484 B2 | 11/2015 | Schulte et al. | |
| 9,911,342 B2* | 3/2018 | Herder | G08G 5/0021 |
| 2003/0137444 A1 | 7/2003 | Stone et al. | |
| 2006/0027651 A1 | 2/2006 | Berckefeldt | |
| 2012/0041620 A1 | 2/2012 | Stayton et al. | |
| 2014/0197981 A1* | 7/2014 | Hartley | G01S 13/74 342/37 |
| 2015/0228196 A1 | 8/2015 | Sampigethaya | |
| 2016/0309291 A1 | 10/2016 | Rodriguez Montejano et al. | |
| 2017/0236425 A1 | 8/2017 | Ballestros et al. | |

FOREIGN PATENT DOCUMENTS

EP    3258456 B1    8/2018

* cited by examiner

*Primary Examiner* — Phuong H Nguyen

(74) *Attorney, Agent, or Firm* — McGarry Bair PC

(57) ABSTRACT

A method for identifying ghost aircraft and a system for displaying information in an aircraft including a flight display onboard the aircraft and configured to display a visual expression of at least some air traffic information and an interrogation module configured to determine information about an other aircraft based on the identification address to define interrogated data, determine real-time information about the other aircraft, compare the real-time information and the interrogated data and update the flight display based on the comparison.

20 Claims, 6 Drawing Sheets

METHOD AND SYSTEM TO IDENTIFY AND DISPLAY SUSPICIOUS AIRCRAFT

CROSS REFERENCE TO RELATED APPLICATION(S)

This application claims the benefit of Great Britain Application No. GB 1819030.6 filed Nov. 22, 2018, which is incorporated herein by reference in its entirety.

BACKGROUND

In contemporary aircraft, traffic information can be displayed including via the traffic collision avoidance systems (TCAS). Cockpit display devices for displaying aircraft traffic have been known for years. The display device can display the location of the nearby aircraft in a variety of different manners, such as a plan view that shows the location of the neighboring aircraft as they would appear to a person looking down from above, three-dimensional views, as well as other views.

BRIEF DESCRIPTION

In one aspect, the disclosure relates to a method of identifying ghost aircraft, the method including receiving, on a first aircraft, a transmission including an identification address configured to identify an other aircraft, determining, via an interrogation module, information about the other aircraft based on the identification address to define interrogated data, determining real-time information about the other aircraft, comparing the real-time information and the interrogated data, and updating a display, within the first aircraft, based on the comparing.

In another aspect, the disclosure relates to a system for displaying information in an aircraft, the system including a receiver adapted to receive an other aircraft identification signal, said aircraft identification signal including an identification address for the other aircraft, a flight display onboard the aircraft and configured to display a visual expression of at least some air traffic information, and an interrogation module operably coupled to receiver and the flight display and configured to determine information about the other aircraft based on the identification address to define interrogated data, determine real-time information about the other aircraft, compare the real-time information and the interrogated data and update the flight display based on the comparison.

DETAILED DESCRIPTION

Figure 1:
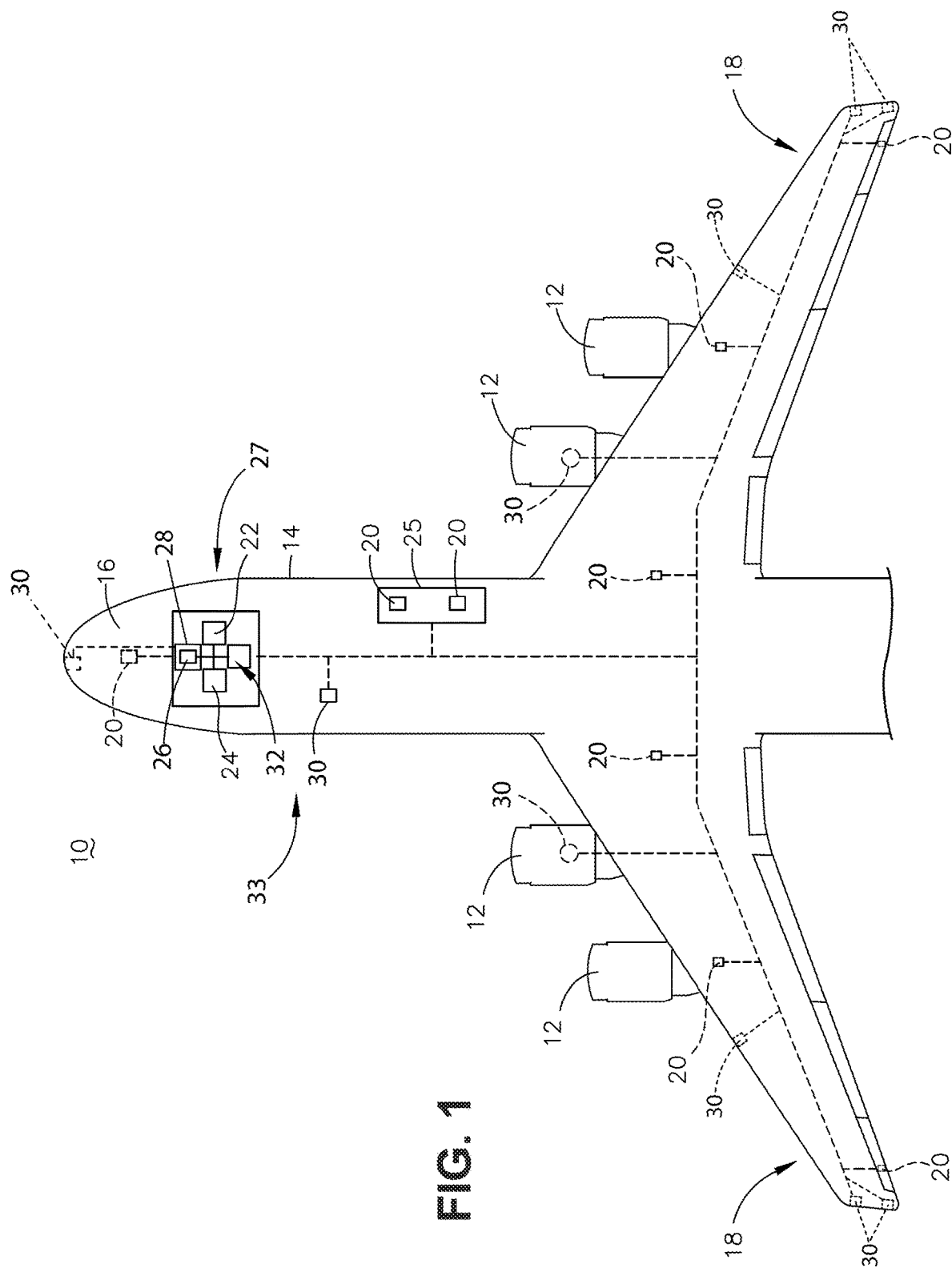
FIG. 1 is a top-down schematic view of a portion of an aircraft according to various aspects described herein.

The described aspects of the present disclosure are directed to the identification and display of suspicious aircraft or ghost aircraft. Aircraft often include a cockpit display and other devices that monitor transponder signals emitted from nearby aircraft. Based upon the information transmitted within the transponder signals, as well as the timing of the transponder signals, the cockpit display is able to determine the location of the neighboring aircraft relative to the aircraft itself and display such information. A ghost aircraft is a group of transmission signals that simulate the presence of an aircraft at a specific location when there is no aircraft at that location. A suspicious aircraft is a group of transmission signals that indicate the presence of an aircraft at a specific location, where the transmission signals could be a ghost aircraft. The terms ghost aircraft and suspicious aircraft can be used interchangeably as the aircraft cockpit display and other devices can identify and display both. Identification can be completed on an onboard device that compares real-time information and interrogated data.

As used herein, "a set" can include any number of the respectively described elements, including only one element. All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order, and relative sizes reflected in the drawings attached hereto can vary.

FIG. 1 depicts a first aircraft 10 that can include one or more propulsion engines 12 coupled to a fuselage 14, a cockpit 16 positioned in the fuselage 14, and wing assemblies 18 extending outward from the fuselage 14. A plurality of aircraft systems 20 that enable proper operation of the first aircraft 10 can be included as well as a flight control computer 22, and a communication system having a wireless communication link 24. While a commercial aircraft has been illustrated, it is contemplated that aspects of the disclosure can be used in any type of aircraft including, but not limited to, fixed-wing, rotating-wing, personal aircraft or unmanned aircraft.

The plurality of aircraft systems 20 can reside within the cockpit 16, within an electronics and equipment bay 25, or in other locations throughout the first aircraft 10 including that they can be associated with the one or more propulsion engines 12. The aircraft systems 20 can include but are not limited to: an electrical system, an oxygen system, hydraulics and/or pneumatics system, a fuel system, a propulsion system, navigation systems, flight controls, audio/video systems, an Integrated Vehicle Health Management (IVHM) system, Onboard Maintenance System (OMS), Central Maintenance Computer (CMC), and systems associated with the mechanical structure of the first aircraft 10. The aircraft systems 20 have been illustrated for exemplary purposes and it will be understood that they are only a few of the systems that can be included in the first aircraft 10.

The cockpit 16 can include at least one flight display 28 configured to display a variety of parameters including flight time, fuel consumption, weather conditions, pilot advisories, air traffic information, or current heading. The flight display 28 can include an electronic screen, and can also be configured to receive user input via a touchscreen, keyboard, buttons, dials, or other input devices.

The flight control computer 22, which can include a flight management computer, can among other things, automate the tasks of piloting and tracking the flight plan of the first aircraft 10. The flight control computer 22 can include or be associated with any suitable number of individual microprocessors, power supplies, storage devices, interface cards, auto flight systems, flight management computers, and other standard components. The flight control computer 22 can include or cooperate with any number of software programs (e.g., flight management programs) or instructions designed to carry out the various methods, process tasks, calculations, and control/display functions necessary for operation of the first aircraft 10. The flight control computer 22 is illustrated as being in communication with the plurality of aircraft systems 20, the wireless communication link 24, and the flight display 28. It is contemplated that the flight control computer 22 can aid in operating the aircraft systems 20 and can send and receive information from the aircraft systems 20. By way of non-limiting example, the flight control computer 22 can include or otherwise be operably coupled with traffic collision avoidance systems (TCAS) that can send and receive information from the aircraft systems 20. The TCAS information can be communicated, for example, using a traffic simulator 26 on the flight display 28.

The wireless communication link 24 can be communicably coupled to the flight control computer 22 or other processors of the first aircraft 10. Such a wireless communication link 24 can be any variety of communication mechanism capable of wirelessly linking with other systems and devices both inside and outside the first aircraft 10 and can include, but is not limited to, packet radio, satellite uplink, Wireless Fidelity (Wi-Fi), WiMax, Bluetooth, Zig-Bee, 3G wireless signal, Code Division Multiple Access (CDMA) wireless signal, Global System for Mobile communication (GSM), 4G wireless signal, Long Term Evolution (LTE) signal, Ethernet, or any combinations thereof. It will also be understood that the particular type or mode of wireless communication is not critical to this disclosure, and later-developed wireless networks are certainly contemplated as within the scope of this disclosure. Further, the wireless communication link 24 can be communicably coupled with the flight control computer 22 through a wired link without changing the scope of this disclosure. Although only one wireless communication link 24 has been illustrated, it is contemplated that the first aircraft 10 can have multiple wireless communication links communicably coupled with the flight control computer 22 or other onboard computing device receiving or sending flight information. Such multiple wireless communication links can provide the first aircraft 10 with the ability to transfer flight data onto or off of the first aircraft 10 in a variety of ways such as by satellite, GSM, and Wi-Fi.

Sensors 30 can be provided on or within the first aircraft 10. The sensors 30 can include any number of communication or detection components that can be, but are not limited to, receivers, transponders coupled with a receiver, transmitters coupled with a receiver, sonic detectors or devices, passive radar, optical detectors or devices, or electromagnetic wave detectors or devices. The sensors 30 can be operably coupled to the flight control computer 22 or another controller onboard the first aircraft 10.

The sensors 30 can function as receivers that can receive optical, radio, sonic, electromagnetic, or other signals. The sensors 30 can also receive real-time flight data, information about the surroundings of the first aircraft 10, and act as receivers for additional signals. The sensors 30 can also include a receiver adapted to receive an other aircraft identification signal. Alternatively, the receiver can be a separate apparatus communicatively linked to the flight control computer 22 or other portions of the aircraft 10. The aircraft identification signal can include an identification address for the other aircraft emitting the signal. It is contemplated that the sensors 30 can be operably coupled with the wireless communication link 24 to allow the information obtained by the sensors 30 to be relayed off the first aircraft 10, such as to a second aircraft 40 (FIG. 2).

Figure 2:
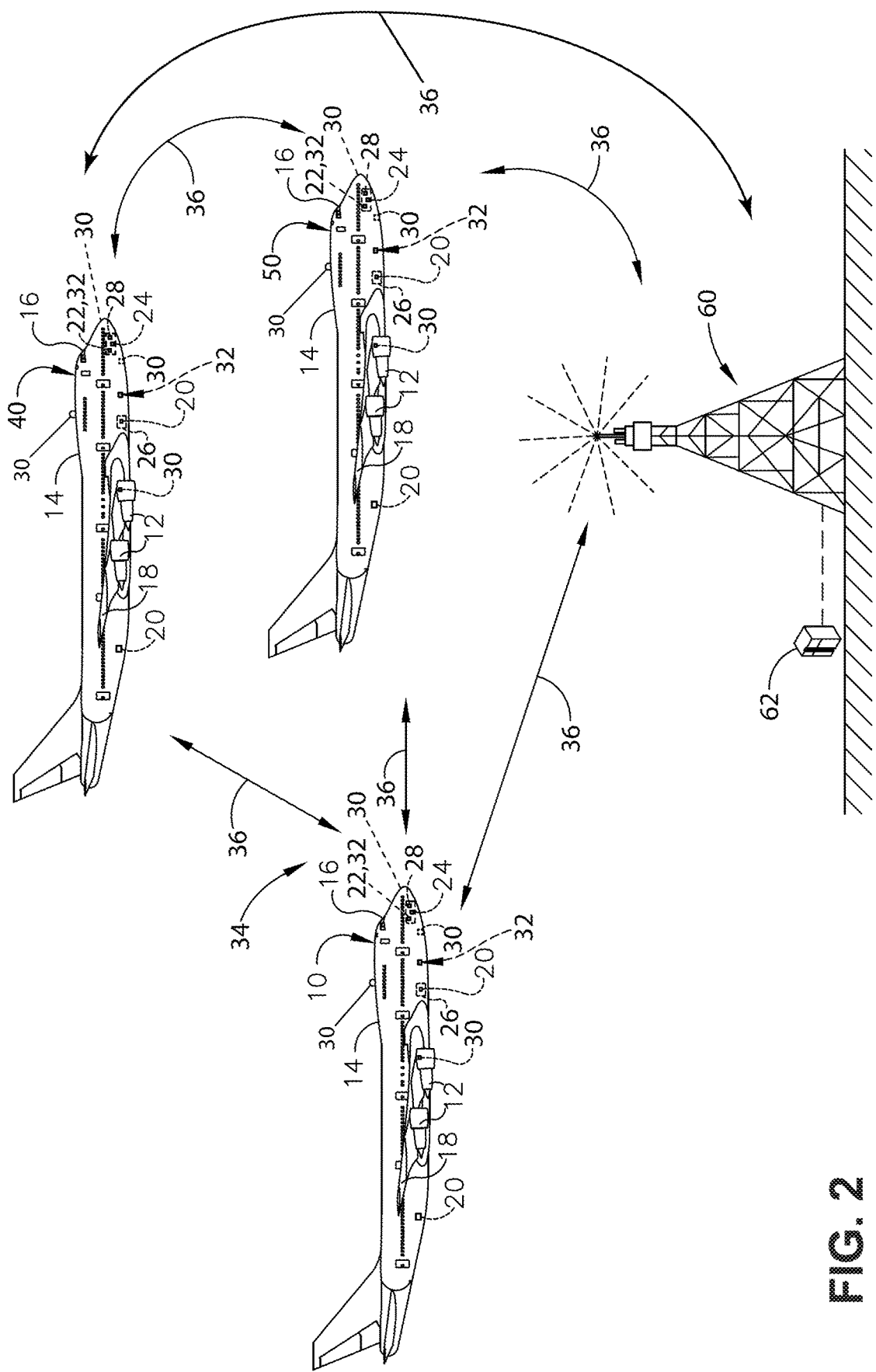
FIG. 2 is a schematic illustration of the aircraft of FIG. 1 transmitting and receiving information from a ground system and additional aircraft according to various aspects described herein.

It is further contemplated that the sensors 30 or the wireless communication link 24 can receive information relayed from another location such as the second aircraft 40 (FIG. 2). Further still, the sensors 30 can function as transmitters that can send optical, radio, sonic, electromagnetic, or other signals. The transmissions can be sent automatically or in response to a received signal.

Among other things, the sensors 30 can be capable of sensing and providing real-time environmental data, real-time traffic data, real-time flight data, or other real-time data as requested by the first aircraft 10. By way of further non-limiting example, for the real-time flight data the sensors 30 can sense information or data related identification transmissions from another aircraft, sensor data from sensors on the another aircraft, presence or location of the another aircraft, speed or velocity of the another aircraft, altitude of the another aircraft, information from ground stations, or other performance data related to the first aircraft 10 or an other aircraft. The sensors 30 can also be capable of integrating such information with coordinates of where the data was obtained from by the sensor 30 as well as a time stamp of when such information was obtained from the sensor 30.

A ghost aircraft interrogation module 32 (also referred to herein as an "interrogation module" 32) can also be included in the first aircraft 10. The interrogation module 32 can include, among other things, a processor and memory. The memory can include random access memory (RAM), read-only memory (ROM), flash memory, or one or more different types of portable electronic memory or any suitable combination of these types of memory. The interrogation module 32 can further be configured to run any suitable programs. Non-limiting embodiments of the disclosure can be included wherein, for example, the interrogation module 32 can also be connected with other controllers, processors, or systems of the aircraft 10, or can be included as part of or a subcomponent of another controller, processor, or system of the aircraft 10. A computer searchable database of information can be stored in the memory or another portion of the aircraft 10 and accessible by the interrogation module 32. The interrogation module 32 can run a set of executable instructions to display the database or access the database. Alternatively, the interrogation module 32 can be operably coupled to a database of information. For example, such a database can be stored on an alternative computer or controller. It will be understood that the database can be any suitable database, including a single database having multiple sets of data, multiple discrete databases linked together, or even a simple table of data. It is contemplated that the database can incorporate a number of databases or that the database can actually be a number of separate databases. The database can store data that can include, among other things, an international civil aviation organization (ICAO), tail number, aircraft model, performance parameters based on aircraft model, flight plans or status based on ICAO code or tail number, or country of origin. It will be understood that any of the information can be tied to an ICAO or other identification of an aircraft in a lookup table or other mechanism in the database. Thus, once an ICAO or other identifying of the an other aircraft can be determined additional information related to that aircraft can be determined including its model, top speeds and altitudes, flight plans or country of origin, etc.

The interrogation module 32 can be communicatively coupled with the flight control computer 22. It will be understood that the interrogation module 32 can be hard wired to the flight control computer 22 or can communicate in any suitable manner with the flight control computer 22 including via wireless communication.

The interrogation module 32 can recall, process, or compare data or information. The data or information can be provided to the interrogation module 32, for example, by the sensors 30, the wireless communication link 24, or the flight control computer 22. It is contemplated that a communication assembly 33 can be formed by one or more portions of the previously described aircraft 10 such as the communication link 24 or the sensor 30 and that the communication assembly 33 can be operably coupled with the interrogation module 32. Alternatively or additionally the interrogation module 32 can be operably coupled with additional communication systems or sub-systems such that the interrogation module 32 can query or otherwise receive information from any suitable source including at least one of on or off the aircraft. The communication assembly 33 can receive information from another or secondary aircraft or a ground station as further illustrated in FIG. 2. The received information can include information related to a presence of the another aircraft at a broadcast location or information about the another aircraft based on the identification address. The interrogation module 32 in combination with any of the suitable parts of the aircraft 10 including but not limited to the communication assembly 33, the communication link 24, the flight control computer 22, flight display 28, and the sensors 30 can form a system 27 for displaying information in an aircraft related to ghost aircraft or suspicious aircraft.

The program for transmitting or receiving the real-time flight data or determining interrogated data can include a computer program product that can include machine-readable media for carrying or having machine-executable instructions or data structures stored thereon. Such machine-readable media can be any available media, which can be accessed by a general purpose or special purpose computer or other machine with a processor. Aspects of the present disclosure will be described in the general context of a method that can be implemented by a program product including machine-executable instructions such as program code, for example, in the form of program modules. Generally, program modules include routines, programs, objects, components, data structures, algorithms, etc. that have the technical effect of performing particular tasks or implement particular abstract data types. Machine-executable instructions, associated data structures, and program modules represent examples of program code for executing the method disclosed herein. Machine-executable instructions can include, for example, instructions and data, which cause a general purpose computer, special purpose computer, or special purpose processing machine to perform a certain function or group of functions.

FIG. 2 illustrates an exemplary network 34 including the first aircraft 10. The network 34, by way of non-limiting example, is illustrated as including the first aircraft 10, the second aircraft 40, an other aircraft 50, and a ground station or ground system 60. It is contemplated that the network 34 can include any number of aircraft or ground systems. The second aircraft 40 or the other aircraft 50 can be similarly equipped with wireless communication link(s) 24 and other components of the first aircraft 10 as described in FIG. 1. Transmissions 36 to, from, or within the network 34 are illustrated with arrows, and it should be understood the transmissions 36 can include an aircraft identification signal, an identification address, real-time weather data, real-time flight data, real-time performance information, or any other suitable data or information. The transmissions 36 between two aircraft can occur as long as the two aircraft are within the range or as long as there is one or more linking ground station(s) or aircraft between them. It is further contemplated that aircraft not within range of the network cannot be queried for data.

In addition, the first aircraft 10, the second aircraft 40, and the other aircraft 50 are illustrated with flight control computers 22, the interrogation modules 32, wireless communication links 24, exemplary aircraft systems 20, and sensors 30 for illustrative purposes. A computer or destination server 62 is also illustrated and can indirectly communicate via the network 34 with the first aircraft 10. The computer or destination server 62 can be located at or in communication with the ground system 60. The ground system 60 can be any type of communicating ground system such as an airline operations center. Additionally, the transmissions 36 between two aircraft can be relayed through another communication link which can be wireless, such as the ground system 60.

The network 34 can form an airborne mesh information system. In the airborne mesh information system, the system connection can be spread out among dozens or even hundreds of wireless mesh aircraft that can communicate to share the system connection across a large area. Wireless mesh aircraft can be programmed with software that tells them how to interact within the larger system. Information travels across the system from one location to another by hopping wirelessly from one wireless mesh aircraft to the next. Optionally, the system connection of the airborne mesh information system can also include at least one ground system.

Figure 3:
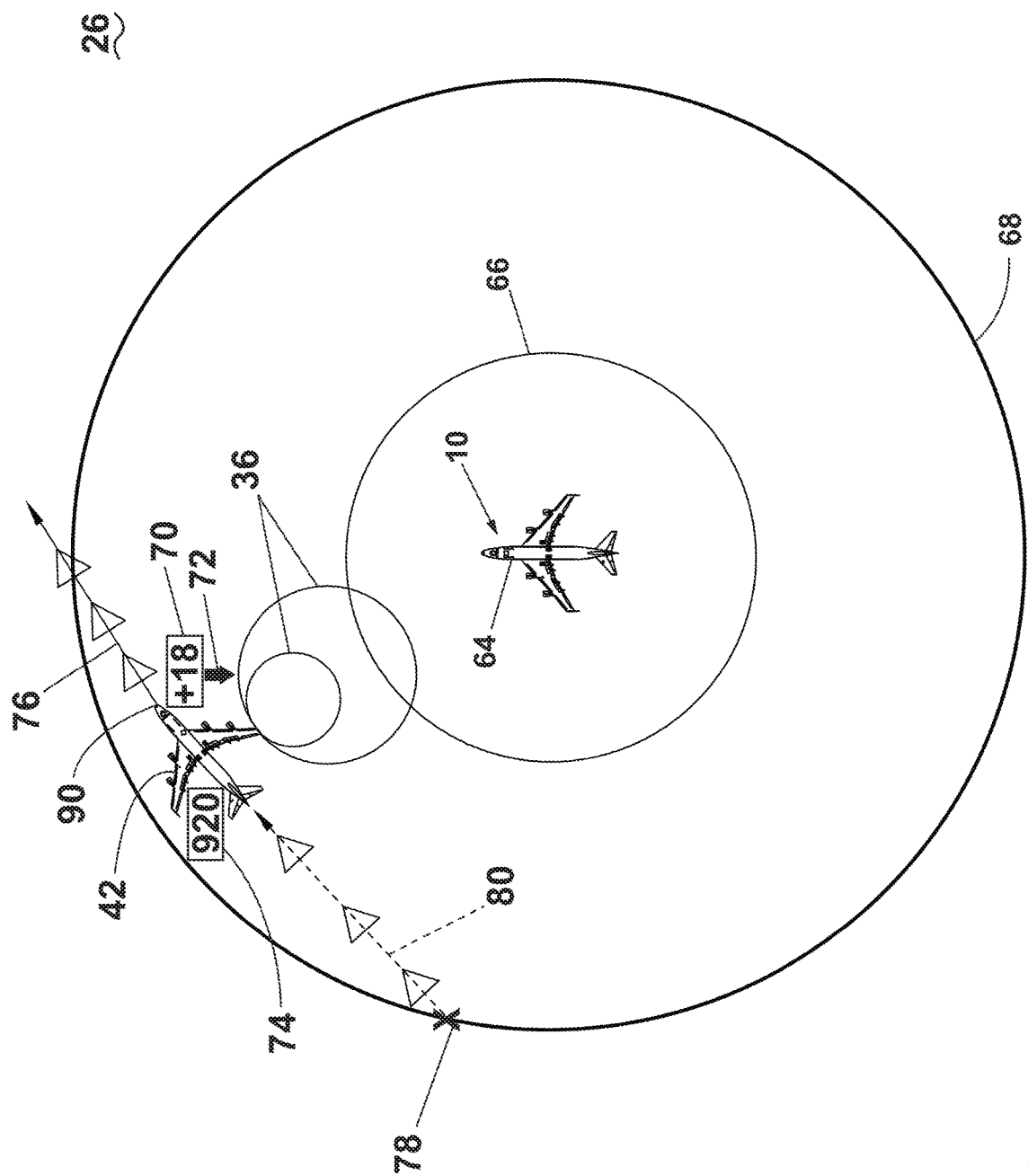
FIG. 3 is a schematic illustration of a traffic simulator that can be include in the aircraft of FIG. 1 according to aspects described herein.

FIG. 3 illustrates a non-limiting example of a traffic simulator 26 that can appear on at least a portion of the flight display 28 of the first aircraft 10. The flight display 28 can be located in the cockpit 16 of the first aircraft 10 to display information to members of the flight crew of the first aircraft 10 (FIG. 1). Alternatively, the traffic simulator 26 can be displayed on portable electronic devices that can include an LCD (Liquid Crystal Diode) display, a TFT (Thin Film Transistor) LCD display, an LEP (Light Emitting Polymer), PLED (Polymer Light Emitting Diode) display, or other known display used to communicate text or graphical information. The flight display 28, or alternative displays described above, can include a graphical user interface.

A representative first image 64 illustrates the first aircraft 10 near the center of the traffic simulator 26. Two concentric circles 66, 68 can be positioned in the traffic simulator 26 to illustrate distances from the first aircraft 10. While illustrated as the two concentric circles 66, 68, it is contemplated that any number of concentric circles can be used in the traffic simulator 26 to represent distances from the first aircraft 10. It is further contemplated that the number of concentric circles or the distance each concentric circles represents can be adjusted or determined by a user.

The traffic simulator 26 is illustrated, by way of non-limiting example, as including the first aircraft 10 and the second aircraft 40. It is contemplated that the traffic simulator 26 can include any number of aircraft, other flying objects, or relevant ground stations. By way of non-limiting example, the second aircraft 40 broadcast transmissions 36 are illustrated by circles on the traffic simulator 26.

A second representative image 42 that is representative of the type of aircraft detected by the sensors 30 can be displayed on the traffic simulator 26 to illustrate the second aircraft 40. Additionally or alternative, the flight control computer 22 or the interrogation module 32 can illustrate real-time information about the second aircraft 40 on the traffic simulator 26. Real-time information can include, but is not limited to, a relative elevation 70, an elevation trend indicator arrow 72, a current speed 74, a current direction 76, or a first detected location 78.

The relative elevation 70 shown in the traffic simulator 26, by way of non-limiting example, can include a number that identifies in specified units, such as tens of meters, the elevation of the second aircraft 40 relative to the first aircraft 10. For example, the second aircraft 40 is illustrated as 180 feet (+18) above the first aircraft 10.

The second aircraft 40, by way of non-limiting example, is illustrated as descending. When descending, the elevation trend indicator arrow 72 is pointing downward. If an aircraft was ascending, the elevation trend arrow would point upward. If an aircraft were flying level, the elevation trend arrow could be removed. Additionally or alternatively, the nose of the second representative image 42 that represents the second aircraft 40 can be tilted upward or downward to indicate elevation trend.

The current speed 74, by way of non-limiting example, can be illustrated on the traffic simulator 26. The current speed 74 can be a number that identifies in specified units, such as kilometers per hour, the speed of an aircraft relative to the ground. Additionally or alternatively, the current speed 74 can be a number that is representative of the relative speed of the another aircraft compared to the current speed of the first aircraft 10, where a positive number would indicate a faster relatives speed to the first aircraft 10, while a negative number could represent a slower current speed relative to the first aircraft 10.

The current direction 76 as detected, by way of non-limiting example, can be illustrated on the traffic simulator 26 as a directional line with at least one arrow projecting from the second representative image 42. Additionally or alternatively, the second representative image 42 can be orientated so that the direction of a representative image of a nose 90, indicates the current direction 76.

The first detected location 78, by way of non-limiting example, can be illustrated using an "X" on the traffic simulator 26. Optionally, a path line 80 can illustrate the path flown by the second aircraft 40 from the first detected location 78 to the second representative image 42. It is further contemplated that the path line 80 can include arrows or numbers to indicate direction, speed, or altitude changes.

In operation, the interrogation module 32 can be used to compare the real-time information obtained about the second aircraft 40 from sensors 30 and the like and the interrogated data as determined from database information about the second aircraft 40. The comparison of the real-time information and the interrogated data can result in a level of suspicion 82. Such comparing will be described in more detail below with respect to the method.

Figure 4:
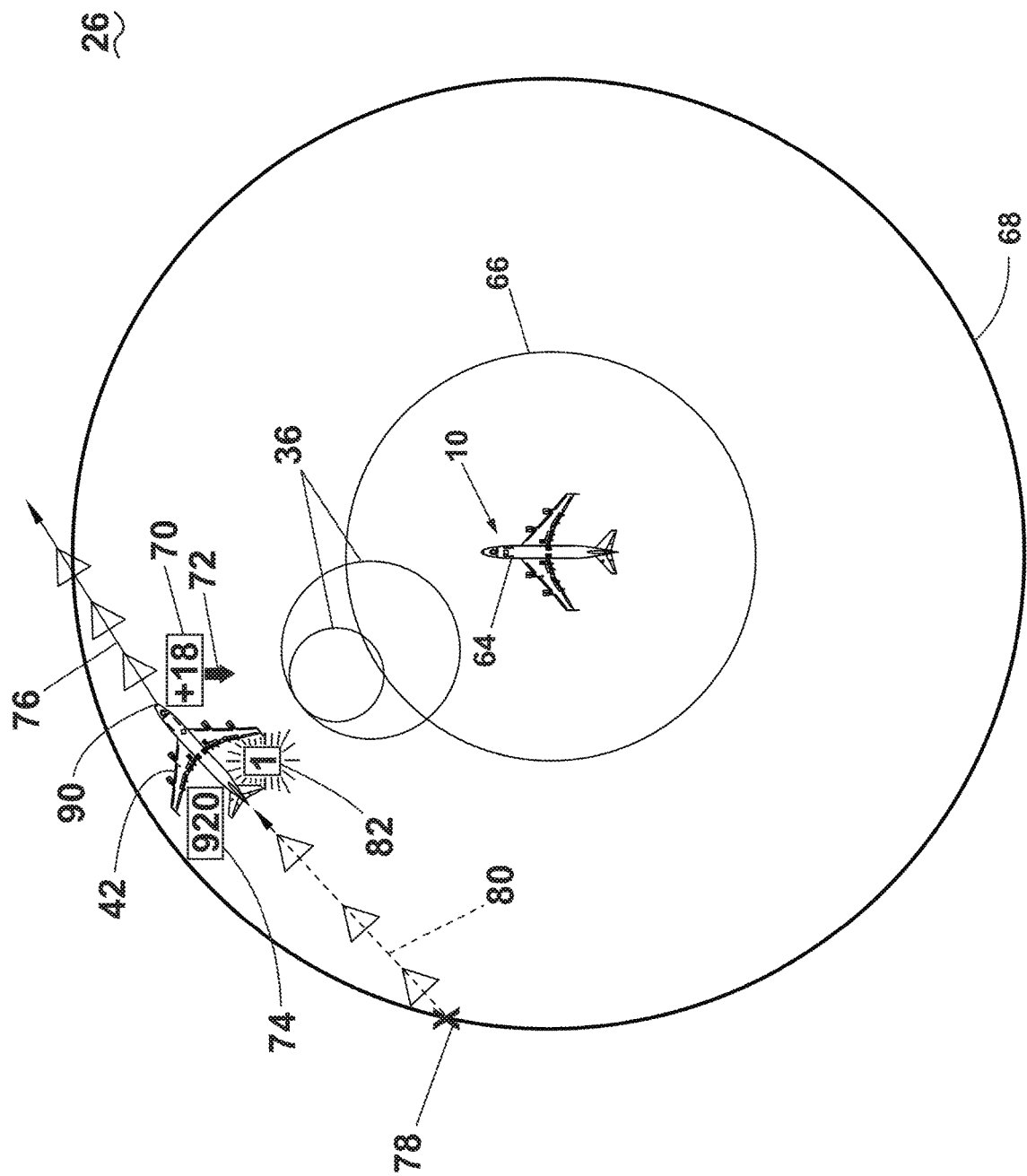
FIG. 4 is a schematic illustration of an update of the traffic simulator of FIG. 3.

The traffic simulator 26 can be updated based on the comparison of the real-time information and the interrogated data, as illustrated in FIG. 4. The level of suspicion 82, by way of non-limiting example, is illustrated on the traffic simulator 26 as a number. The level of suspicion 82 can include a representative number, word, or color. The representative number, word, or color can reference a predetermined level of suspicion. For example, Level 1: Confirmed (No suspicion); Level 2: Checking (Low suspicion); Level 3: Suspicious (possible ghost aircraft); Level 4: Warning (Confirmed aircraft with threatening or disruptive behavior). Additionally or alternatively, the second representative image 42 can change color, flash, or change shading to indicate the level of suspicion 82.

It is contemplated that the information described as being presented on the traffic simulator 26 can be represented or communicated in a variety of ways that can include, but are not limited to, additional audio alarms, letters, or codes. It is further contemplated that the traffic simulator 26 can be customized to show information in a number of different selections and that a user can select the method or units by which the information is communicated.

Figure 5:
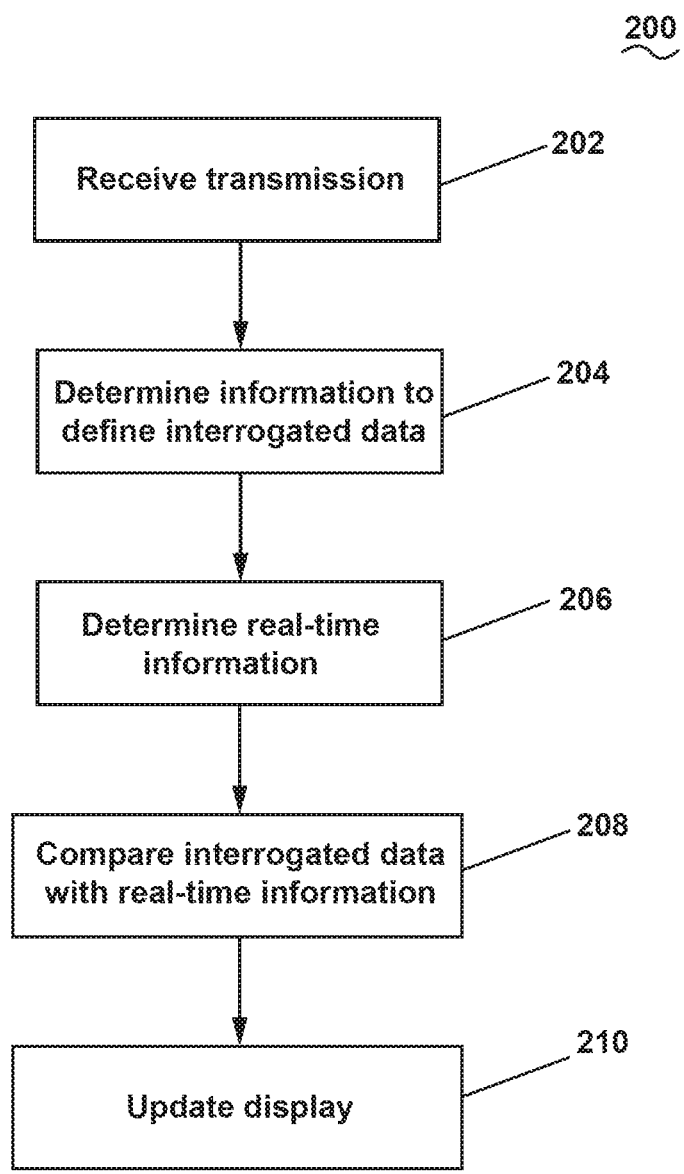
FIG. 5 is a flow chart diagram illustrating a method of identifying ghost aircraft that can be carried out at least in part by the aircraft of FIG. 1, according to various aspects described herein.

FIG. 5 is a flow chart illustrating a method 200 of identifying suspicious aircraft or ghost aircraft. At 202, the first aircraft 10 receives directly or indirectly one or more of the transmissions 36. The transmissions 36 can be received by the wireless communication link 24 or the sensors 30 of the first aircraft 10. The wireless communication link 24 or the sensors 30 can be in communication with the flight control computer 22 or the interrogation module 32.

The transmissions 36 can, by way of non-limiting example, part of an automatic dependent surveillance-broadcast (ADS-B) transmission that can include an identification address. The identification address can include, by way of non-limiting example, an ICAO code or tail number that can be used to identify the another aircraft. The identification address can be extracted from an ADS-B transmission received by the wireless communication link 24 or the sensors 30 and interpreted by the flight control computer 22 or the interrogation module 32. It is further contemplated that the flight control computer 22 or the interrogation module 32 can send or receive data from any number of aircraft or communication locations located on the ground or in the air, such as, but not limited to, control towers, drones, or satellites.

At 204, the interrogation module 32 or the flight control computer 22 can use the identification address, ICAO code, or the tail number to determine information about the another aircraft. Information about the another aircraft can be determined using the identification address, ICAO code, or the tail number to access or look-up information in an onboard database. Optionally, the onboard database can include data for all aircraft located within a predetermined range of a flight path of the first aircraft 10.

Additionally or alternatively, the information about the another aircraft can be determined through the network 34 using the identification address, ICAO code, or the tail number to access, look-up, or otherwise obtain information from an external source such as, but not limited to, the computer or destination server 62. The determined information about the another aircraft can be used to define interrogated data for the another aircraft. The interrogated data can include, but is not limited to, country of origin, flight plan, flight status, aircraft model, performance parameters of the other aircraft, or engine model. Optionally, the interrogated data is stored to memory that can be in communication with the flight control computer 22 or the interrogation module 32.

At 206, real-time information about the another aircraft is determined.

The real-time information can include, by way of non-limiting examples, altitude, speed, broadcast location, time, or direction. The real-time information can be determined from the transmissions 36 or the sensors 30. The transmissions 36 from the another aircraft can directly provide the real-time information. Additionally or alternatively, the real-time information about the another aircraft can be obtained from the transmissions 36 from any aircraft other than the another aircraft, the ground system 60, or other transition location. Additionally or alternatively, the sensors 30 can be configured to directly measure the real-time information by optical, sonic, or other sensing or detecting means.

Optionally, the flight control computer 22 or the interrogation module 32 can use the real-time data to determine the relative elevation 70, 170, the elevation trend indicator arrow 72, 172, the current speed 74, 174, the current direction 76, 176, or the first detected location 78, 178. Additionally, the traffic simulator 26, 126 of the flight display 28, 128 can be updated based on the real-time data.

The comparison of the real-time information and the interrogated data occurs at 208. The flight control computer 22 or the interrogation module 32 can compare the real-time information and the interrogated data. By way of non-limiting example, an actual performance defined by the real-time information can be compared to a capability of the other aircraft defined by the interrogated data. Actual performance real-time information can include a speed of the another aircraft. The speed can be compared to speed capability or performance parameters as determined by the interrogated data. Additionally or alternatively, actual performance real-time information can include an altitude of the another aircraft. The altitude can be compared to vertical capability or performance parameters as determined by the interrogated data. Additionally or alternatively, actual performance real-time information can include a broadcast location of the another aircraft. The broadcast location can be compared to the flight plan as determined by the interrogated data.

Additionally or alternatively, at 208, a sensor 30, can check for a presence of the another aircraft at the broadcast location, where the broadcast location is a three dimensional location from which the transmissions 36 from the another aircraft is presumed to be emitted. Optionally, at least one of the sensors 30 can be configured to output a signal related to a presence of the another aircraft at the broadcast location. The detection or failure to detect the another aircraft at the broadcast location can be added to the real time information used at 210 to update the display.

At 210, the flight display 28 within the first aircraft 10 is updated based on the comparison of the real-time information and the interrogated data at 208. By way of non-limiting example, when the comparing indicates actual performance, defined by the real-time information, falls within the capabilities defined by the interrogated data, the updating can include changing the level of suspicion 82, 182 to illustrate aircraft is performing as expected.

Another non-limiting example can include when the comparing indicates actual performance, defined by the real-time information, is greater than capability defined by the interrogated data, the updating includes flagging the another aircraft as suspicious. The flagging of suspicious can be completed by changing the level of suspicion 82, 182.

It is further contemplated further adjusting of the traffic simulator 26, 126 of the flight display 28, 128 at 210 can be based on the checking for the presence of the another aircraft at the broadcast location. The detection of the another aircraft at the broadcast location can include changing the level of suspicion 82, 182 to illustrate the another aircraft's located is confirmed. The failure to detection the another aircraft at the broadcast location can result in flagging the another aircraft as suspicious. The flagging of suspicious can be completed by changing the level of suspicion 82, 182.

Optionally, at 210 based on surpassing predetermined limits of discrepancy between the interrogated data and real-time information found during the comparison at 208, the another aircraft can be confirmed as a ghost aircraft and removed from the traffic simulator 26, 126 of the flight display 28, 128. It is also contemplated that the another aircraft can be removed from the traffic simulator 26, 126 of the flight display 28, 128 by the user.

By way of another non-limiting example, at 202, the first aircraft 10 can receive the transmissions 36 from the second aircraft 40 with the sensors 30. The transmissions 36 can be a Mode S transmission that includes an aircraft identification signal. The aircraft identification signal is communicated from the sensors 30 to the interrogation module 32. The aircraft identification signal includes the identification address and the ICAO code for the second aircraft 40. At 204, the interrogation module 32 determines information about the second aircraft 40 based on the identification address and the ICAO code. The identification address or ICAO code can be compared to the onboard database by the interrogation module 32 to determine the aircraft model of the second aircraft 40. Optionally, the aircraft model of the interrogated data for the second aircraft 40 can be used to produce the second representative image 42 on the traffic simulator 26.

The interrogated data of the second aircraft 40 defined by the determined information obtained from the identification address of the second aircraft 40 can be stored in the interrogation module 32. Non-limiting examples of the interrogated data of the second aircraft 40 determined from the aircraft identification signal can include India as the country of origin, the flight plan from New Delhi to Shanghai, the aircraft model corresponding to the ICAO code a Boeing 747, and that the maximum speed of the Boeing 747 is approximately 920 km/h.

At 206, the real-time information for the second aircraft 40 can be determined by transmissions 36 from the second aircraft 40 that are communicated or detected by the first aircraft 10 by sensors 30. The sensors 30 can communicate with the interrogation module 32. The interrogation module 32 is illustrated as determining the relative elevation 70 to be 180 meters. By way of non-limiting example, the relative elevation 70 of the second aircraft 40 can be determined by calculating a difference between the altitude of the first aircraft 10 and the second aircraft 40.

Since the real-time information can be stored with a time and location identification, the elevation trend indicator arrow 72 can be determined by the interrogation module 32 using more than one altitude measurement. The elevation trend indicator arrow 72 for the second aircraft 40 indicates that the second aircraft 40 is descending, which is an indication of a decrease between measurements of altitude for the second aircraft 40.

The current speed 74 of the second aircraft 40 is illustrated as 920 km/h. The current speed 74 can be determined using a variety of known algorithms, formulas, or techniques that can include, but are not limited to, using two position locations and their relative times. The current speed can be determined by the computer or destination server 62 and communicated to the interrogation module 32 of the first aircraft 10 via the airborne mesh information system that can be the network 34.

The current direction 76 can be determined using sensors 30 on the first aircraft 10 that receive transmissions 36 from the second aircraft 40. Similarly, the first detected location 78 can be determined using sensors 30 on the first aircraft 10 that receive transmissions 36 from the second aircraft 40.

The traffic simulator 26 is updated to reflect the real-time information and the interrogated data. The traffic simulator 26 is further updated at 210 to illustrate the comparison at 208 of the real-time information and the interrogated data. The level of suspicion 82 is illustrated in FIG. 3 as the number "1." This is a result of several comparisons between the real-time information and the interrogated data.

The first comparison at 208 is between the ICAO code transmitted from the second aircraft 40 to the onboard database of the first aircraft 10. For the second aircraft 40, in this example, the ICAO code was found and verified by the onboard database that includes the interrogated data for all aircraft located within a predetermined range of a flight path of the first aircraft 10.

The second aircraft 40, identified by the ICAO code as a Boeing 747 has the current speed 74 of 920 km/h. The real-time information of actual performance of speed is within the speed capability or performance parameters identified in the interrogated data of the second aircraft 40, since the Boeing 747 is capable of traveling at a speed of 940 km/h.

The actual performance real-time information of the altitude of the second aircraft 40 is also within vertical capability or performance parameters included in the interrogated data of the Boeing 747.

The actual performance real-time information can include the broadcast location of the second aircraft 40. The broadcast location can be compared to the flight plan from the interrogated data of the second aircraft 40. The second aircraft 40 is within the tolerated range of variance that can be calculated with the help of the airborne mesh information system of the network 34. Similarly the real-time information of the first detected location 78 can be checked against the flight plan from the interrogated data of the second aircraft 40.

The similarities and consistency during the comparison of the real-time information and the interrogated data results in determination of the level of suspicion 82 to be level 1.

Figure 6:
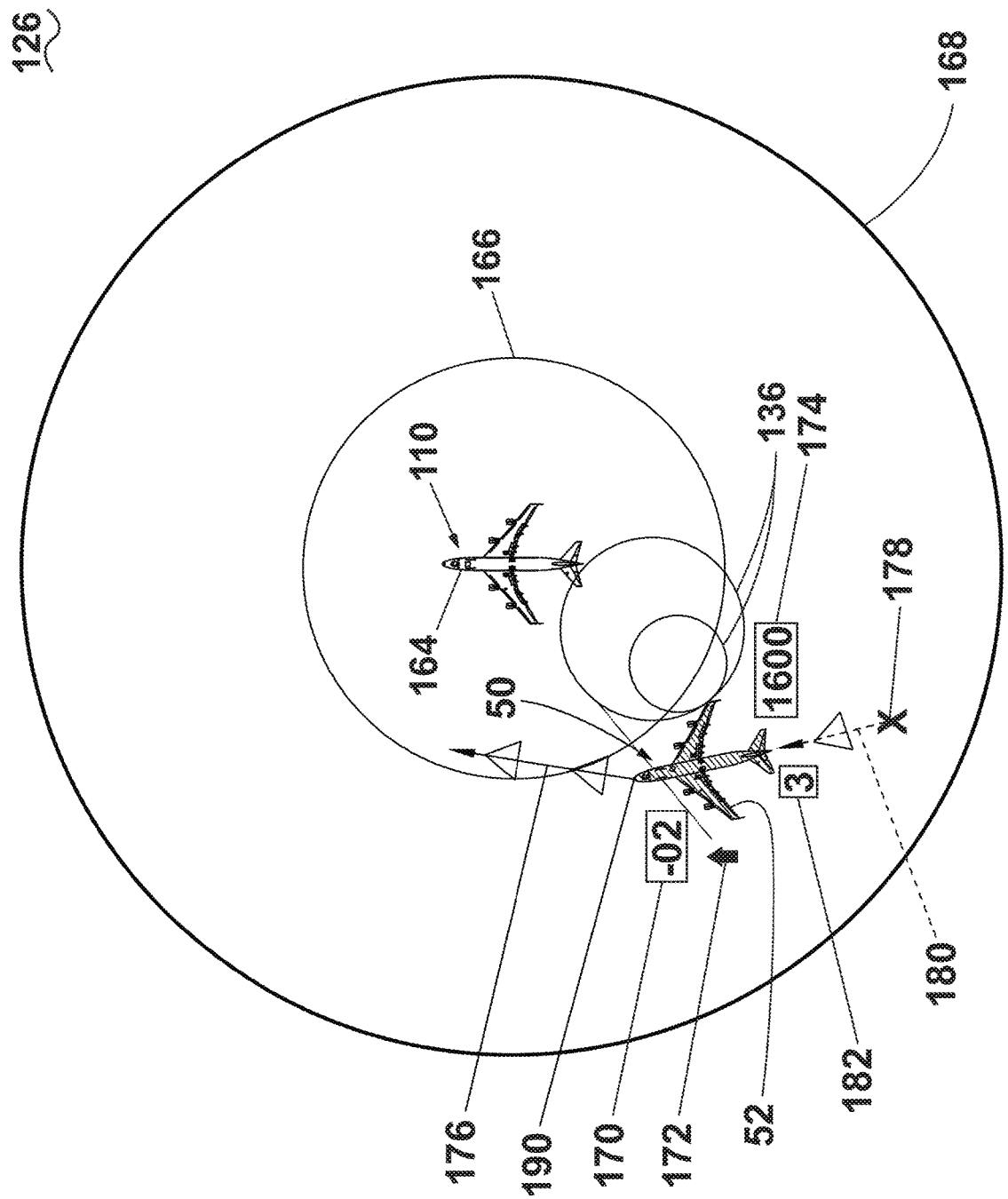
FIG. 6 is a schematic illustration of a traffic simulator that can be include in the aircraft of FIG. 1 according to additional aspects described herein.

FIG. 6 is a schematic illustration of a traffic simulator 126 according to additional aspects described herein. The traffic simulator 126 is substantially similar to the traffic simulator 26. Therefore, like parts will be identified with like numerals increased by 100, with it being understood that the description of the like parts of the traffic simulator 26 applies to the traffic simulator 126 unless otherwise noted. By way of non-limiting example, at 202, a first aircraft 110 can receive transmissions 136 from the other aircraft 50 with the sensors 30. The transmissions 136 can be a Mode S transmission that includes an aircraft identification signal. The aircraft identification signal is communicated from the sensors 30 to the interrogation module 32. The aircraft identification signal includes the identification address and the ICAO code for the other aircraft 50. At 204, the interrogation module 32 determines information about the other aircraft 50 based on the identification address and the ICAO code. The identification address or ICAO code can be compared to the onboard database by the interrogation module 32 to determine the aircraft model of the other aircraft 50. If the identification address or ICAO code is not found in the onboard database by the interrogation module 32, the other aircraft 50 is determined to be suspicious. Optionally, the aircraft model of the interrogated data for the other aircraft 50 can be used to produce a third representative image 52 on the traffic simulator 126.

The interrogated data of the other aircraft 50 defined by the determined information obtained from the identification address of the other aircraft 50 can be stored in the interrogation module 32. Non-limiting examples of the interrogated data of the other aircraft 50 determined from the aircraft identification signal can include Canada as the country of origin, the flight plan from New Delhi to Toronto, the aircraft model corresponding to the ICAO code is a Boeing 747, and that the maximum speed of the Boeing 747 is approximately 920 km/h.

At 206, the real-time information for the other aircraft 50 can be determined by the transmissions 136 from the other aircraft 50 that are communicated or detected by the first aircraft 110 by sensors 30. The sensors 30 can communicate with the interrogation module 32. The interrogation module 32 is illustrated as determining the relative elevation 170 to be 60 meters below the first aircraft 10. By way of non-limiting example, the relative elevation 170 of the other aircraft 50 can be determined by calculating a difference between the altitude of the first aircraft 110 and the other aircraft 50.

Since the real-time information can be stored with a time and location identification, the elevation trend indicator arrow 172 can be determined by the interrogation module 32 using more than one altitude measurement. The elevation trend indicator arrow 172 for the other aircraft 50 indicates that the other aircraft 50 is ascending, which is an indication of an increase between measurements of altitude for the other aircraft 50.

The current speed 174 of the other aircraft 50 is illustrated as 1600 km/h. The current speed 174 can be determined using a variety of known algorithms, formulas, or techniques that can include, but are not limited to, using two position locations and their relative times. The current speed can be determined by the computer or destination server 62 and communicated to the interrogation module 32 of the first aircraft 10 via the airborne mesh information system that can be the network 34.

The current direction 176 can be determined using sensors 30 on the first aircraft 10 that receive transmissions 136 from the other aircraft 50. Similarly, the first detected location 178 can be determined using sensors 30 on the first aircraft 110 that receive transmissions 136 from the other aircraft 50. Additionally or alternatively the current direction 176 or the first detected location 178 can be measured directly by the sensors 30. It is also contemplated that the current direction 176 or the first detected location 178 can be determined by transmissions from the ground system 60, another aircraft, or any other transmission sources.

The traffic simulator 126 is updated to reflect the real-time information and the interrogated data. The traffic simulator 126 is further updated at 210 to illustrate the comparison at 208 of the real-time information and the interrogated data. The level of suspicion 182 is illustrated in FIG. 6 as the number "3." This is a result of several comparisons between the real-time information and the interrogated data.

The first comparison at 208 is between the ICAO code transmitted from the other aircraft 50 to the onboard database of the first aircraft 110. For the other aircraft 50, in this example, the ICAO code was found and verified by the onboard database that includes the interrogated data for all aircraft located within a predetermined range of a flight path of the first aircraft 110.

The actual performance real-time information of the altitude of the other aircraft 50 is within vertical capability or performance parameters included in the interrogated data of the Boeing 747.

The actual performance real-time information can include the broadcast location of the other aircraft 50. The broadcast location can be compared to the flight plan from the interrogated data of the other aircraft 50. The other aircraft 50 is not within the tolerated range of variance that can be calculated with the help of the airborne mesh information system of the network 34. Similarly the real-time information of the first detected location 178 does not appear at the edge of the range of the sensors 30.

The other aircraft 50, identified by the ICAO code as a Boeing 747 has the current speed 174 of 1600 km/h. The real-time information of actual performance of speed is greater than the capability or performance parameters of the other aircraft 50 identified in the interrogated data of the Boeing 747. The updating at 210 of the traffic simulator 126 includes flagging the other aircraft 50 as suspicious with the level of suspicion 182 at level 3. This is the result of the inconsistencies during the comparison of the real-time information and the interrogated data at 208.

Aspects of the present disclosure provide for a variety of benefits. One benefit of the system for displaying information in an aircraft is the ability to distinguish between verified aircraft and suspicious or ghost aircraft. The ability to detect a suspicious or a ghost aircraft can help to ensure the flight path of the plane is not unnecessarily changed.

The method of identifying ghost aircraft includes sensors coupled to an interrogation module that compares the interrogated data with the real-time information having the technical effect of communicating via a display, the level of suspicious of detected aircraft.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

Further aspects of the invention are provided by the subject matter of the following clauses:

1. A method of identifying ghost aircraft, the method comprising receiving, on a first aircraft, a transmission including an identification address configured to identify an other aircraft, determining, via an interrogation module, information about the other aircraft based on the identification address to define interrogated data, determining real-time information about the other aircraft, comparing the real-time information and the interrogated data, and updating a display, within the first aircraft, based on the comparing.

2. The method of any preceding clause wherein the interrogation module determines information from at least one of an onboard database or a ground station.

3. The method of any preceding clause wherein the interrogated data includes at least one of country of origin, flight plan, flight status, aircraft model, performance parameters of the other aircraft, or engine model.

4. The method of any preceding clause wherein the onboard database includes the interrogated data for all aircraft located within a predetermined range of a flight path of the first aircraft.

5. The method of any preceding clause wherein the other aircraft is determined to be suspicious if an ICAO code for the other aircraft is not located in the onboard database.

6. The method of any preceding clause wherein the real-time information is one of an altitude or speed determined from the transmission.

7. The method of any preceding clause wherein when the comparing indicates actual performance, defined by the real-time information, is greater than capability of the other aircraft, defined by the interrogated data, the updating includes flagging the other aircraft as suspicious.

8. The method of any preceding clause wherein when the comparing indicates actual performance, defined by the real-time information, is greater than capability of the other aircraft, defined by the interrogated data, the updating includes flagging the other aircraft as suspicious.

9. The method of any preceding clause, further comprising checking, via a sensor, for a presence of the other aircraft at a broadcast location.

10. The method of any preceding clause, further comprising further adjusting the display based on the checking.

11. The method of any preceding clause wherein the sensor is aboard a secondary aircraft communicatively coupled to the first aircraft.

12. The method of any preceding clause wherein the second aircraft is communicatively coupled to the first aircraft via an airborne mesh information system.

13. The method of any preceding clause wherein the transmission is an aircraft identification signal and the identification address comprises an ICAO code.

14. A system for displaying information in an aircraft, the system comprising a receiver adapted to receive an other aircraft identification signal, said aircraft identification signal including an identification address for the other aircraft, a flight display onboard the aircraft and configured to display a visual expression of at least some air traffic information, and an interrogation module operably coupled to the receiver and the flight display and configured to determine information about the other aircraft based on the identification address to define interrogated data, determine real-time information about the other aircraft, compare the real-time information and the interrogated data and update the flight display based on the comparison.

15. The system of any preceding clause, further comprising an onboard database operably coupled to the interrogation module and including information about the other aircraft based on the identification address including at least one of country of origin, flight plan, flight status, aircraft model, performance parameters of the other aircraft, or engine model.

16. The system of any preceding clause wherein the onboard database includes the interrogated data for all aircraft located within a predetermined range of a flight path of the aircraft.

17. The system of any preceding clause wherein the interrogation module is configured to update the flight display to mark the other aircraft as suspicious if an ICAO code for the other aircraft is not located in the onboard database.

18. The system of any preceding clause, further comprising at least one sensor configured to output a signal related to a presence of the other aircraft at a broadcast location.

19. The system of any preceding clause, further comprising a communication assembly operably coupled to the interrogation module and configured to receive information from a secondary aircraft or a ground station.

20. The system of any preceding clause wherein the other aircraft identification signal is a Mode S transmission and the identification address comprises an ICAO code.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of identifying a suspicious or ghost aircraft, the method comprising:
   receiving, on a first aircraft, a transmission including an identification address configured to identify an other aircraft;
   determining, via an interrogation module, information about the other aircraft based on the identification address to define interrogated data, the interrogated data defining a capability of the other aircraft;
   determining real-time information about the other aircraft including an actual performance of the other aircraft;
   comparing the real-time information and the interrogated data to determine whether the actual performance of the other aircraft is greater than the capability of the other aircraft;
   determining a level of suspicion associated with the other aircraft based on the comparing; and
   updating a display, within the first aircraft, based on the level of suspicion.

2. The method of claim 1 wherein the interrogation module determines information from at least one of an onboard database or a ground station.

3. The method of claim 2 wherein the interrogated data includes at least one of country of origin, flight plan, flight status, aircraft model, performance parameters of the other aircraft, or engine model.

4. The method of claim 3 wherein the onboard database includes the interrogated data for all aircraft located within a predetermined range of a flight path of the first aircraft.

5. The method of claim 4 wherein the other aircraft is determined to be suspicious if an ICAO code for the other aircraft is not located in the onboard database.

6. The method of claim 3 wherein the real-time information is one of an altitude or speed determined from the transmission.

7. The method of claim 3 wherein when the comparing indicates the actual performance, defined by the real-time information, is greater than capability of the other aircraft, defined by the interrogated data, the updating includes flagging the other aircraft as suspicious.

8. The method of claim 1 wherein when the comparing indicates the actual performance, defined by the real-time information, is greater than capability of the other aircraft, defined by the interrogated data, the updating includes flagging the other aircraft as suspicious.

9. The method of claim 8, further comprising checking, via a sensor, for a presence of the other aircraft at a broadcast location.

10. The method of claim 9, further comprising further adjusting the display based on the checking.

11. The method of claim 9, wherein the sensor is aboard a secondary aircraft communicatively coupled to the first aircraft via an airborne mesh information system.

12. The method of claim 1 wherein the transmission is an aircraft identification signal and the identification address comprises an ICAO code.

13. A system for displaying information in an aircraft, the system comprising:
   a receiver adapted to receive an other aircraft identification signal, said aircraft identification signal including an identification address for the other aircraft;
   a flight display onboard the aircraft and configured to display a visual expression of at least some air traffic information; and
   an interrogation module operably coupled to the receiver and the flight display and configured to determine information about the other aircraft based on the identification address to define interrogated data, the interrogated data defining a capability of the other aircraft, determine real-time information about the other aircraft, including an actual performance of the other aircraft, compare the real-time information and the interrogated data to determine whether the actual performance of the other aircraft is greater than the capability of the other aircraft, determine a level of suspicion associated with the other aircraft based on the comparison; and update the flight display based on the level of suspicion.

14. The system of claim 13, further comprising an onboard database operably coupled to the interrogation module and including information about the other aircraft based on the identification address including at least one of country of origin, flight plan, flight status, aircraft model, performance parameters of the other aircraft, or engine model.

15. The system of claim 14 wherein the onboard database includes the interrogated data for all aircraft located within a predetermined range of a flight path of the aircraft.

16. The system of claim 15 wherein the interrogation module is configured to update the flight display to mark the other aircraft as suspicious if an ICAO code for the other aircraft is not located in the onboard database.

17. The system of claim 14, further comprising at least one sensor configured to output a signal related to a presence of the other aircraft at a broadcast location.

18. The system of claim 13, further comprising a communication assembly operably coupled to the interrogation module and configured to receive information from a secondary aircraft or a ground station.

19. The system of claim 13 wherein the other aircraft identification signal is a Mode S transmission and the identification address comprises an ICAO code.

20. The method of claim 1, wherein the updating a display, includes displaying at least one of a representative number, word, image, or color that references a predetermined level of suspicion.

* * * * *